United States Patent
Yamasaki (10) Patent No.: US 12,391,286 B2
(45) Date of Patent: Aug. 19, 2025

(54) VEHICLE DRIVE ASSIST APPARATUS

(71) Applicant: SUBARU CORPORATION, Tokyo (JP)

(72) Inventor: Motoki Yamasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 208 days.

(21) Appl. No.: 17/550,134

(22) Filed: Dec. 14, 2021

(65) Prior Publication Data

US 2022/0204045 A1    Jun. 30, 2022

(30) Foreign Application Priority Data

Dec. 25, 2020   (JP) ................... 2020-216180

(51) Int. Cl.
*B60W 60/00*     (2020.01)
*B60W 50/02*     (2012.01)

(52) U.S. Cl.
CPC .... *B60W 60/0053* (2020.02); *B60W 50/0205* (2013.01); *B60W 50/0225* (2013.01); *B60W 2050/0215* (2013.01)

(58) Field of Classification Search
CPC ......... B60W 60/0053; B60W 60/0054; B60W 60/0057; B60W 60/0059;
(Continued)

(56) References Cited

U.S. PATENT DOCUMENTS

2017/0017233 A1* 1/2017 Ichikawa ............. G05D 1/0061
2017/0240182 A1* 8/2017 Hatano ................. B60W 30/16
(Continued)

FOREIGN PATENT DOCUMENTS

| JP | 2018-203180 A | 12/2018 |
|----|---------------|---------|
| JP | 2019-182280 A | 10/2019 |
| JP | 2020-131844 A | 8/2020  |

OTHER PUBLICATIONS

Japanese Office Action issued in corresponding Japanese Patent Appln. No. 2020-216180, dated Jun. 24, 2024, related to U.S. Appl. No. 17/550,134, with English translation.

*Primary Examiner* — Khoi H Tran
*Assistant Examiner* — Tanner L Cullen
(74) *Attorney, Agent, or Firm* — TROUTMAN PEPPER LOCKE LLP (57) ABSTRACT

A vehicle drive assist apparatus includes a traveling environment information acquisition unit, a traveling state information acquisition unit, and a traveling control unit. The traveling environment information acquisition unit acquires traveling environment information. The traveling state information acquisition unit acquires traveling state information. The traveling control unit includes a malfunction detector and a takeover request processor. The malfunction detector detects a malfunction in the traveling environment information acquisition unit and the traveling state information acquisition unit. The takeover request processor executes a takeover request process for manual driving in a case where the malfunction is detected. The takeover request processor includes a waiting time measurement section and an output restricting section. The waiting time measurement section measures a waiting time from detection of the malfunction to transition to the manual driving. The output restricting section restricts an output of a drive source during the waiting time.

14 Claims, 8 Drawing Sheets

(58) Field of Classification Search
CPC ....... B60W 2050/0096; B60W 60/005; B60W 2050/0215; B60W 50/0205; B60W 50/0225; B60W 2540/225; B60W 50/082; G05D 1/0061
See application file for complete search history.

(56) References Cited

U.S. PATENT DOCUMENTS

| | | | | |
|---|---|---|---|---|
| 2019/0152491 | A1* | 5/2019 | Arai | B60W 50/082 |
| 2019/0250607 | A1* | 8/2019 | Sadakiyo | B60W 30/18 |
| 2020/0031362 | A1* | 1/2020 | Lee | B60W 50/14 |
| 2020/0079395 | A1* | 3/2020 | Ibuka | G05D 1/0088 |
| 2020/0198627 | A1* | 6/2020 | Yamashita | B60W 30/09 |
| 2020/0264606 | A1 | 8/2020 | Kuwahara | |
| 2021/0229685 | A1* | 7/2021 | Ibuka | B60W 60/0053 |
| 2021/0309262 | A1* | 10/2021 | Sugano | B60W 60/0051 |
| 2021/0380144 | A1* | 12/2021 | Miki | G08G 1/16 |

* cited by examiner

VEHICLE DRIVE ASSIST APPARATUS

CROSS-REFERENCE TO RELATED APPLICATION

The present application claims priority from Japanese Patent Application No. 2020-216180 filed on Dec. 25, 2020, the entire contents of which are hereby incorporated by reference.

BACKGROUND

The present technology relates to a vehicle drive assist apparatus that assists driving of a vehicle.

Recently, for a vehicle such as an automobile, a drive assist apparatus performing automatic driving and thereby allowing a vehicle to travel without requiring a driver's driving operation has been developed in a variety of ways. While the vehicle is traveling on the basis of the automatic driving, the driver basically has no need to hold a steering wheel or to constantly look at the front, and is allowed to perform a second task. Non-limiting examples of the second task may include reading a book and operating a mobile terminal.

However, in a case where any of the sensors detecting parameters related to the automatic driving malfunctions while the vehicle is traveling on the basis of the automatic driving, and where the drive assist apparatus determines that it is difficult to continue the automatic driving, driving needs to be taken over by the driver. In such a situation, if the drive assist apparatus suddenly performs transition from the automatic driving to manual driving, the driver may be confused. To address this, the drive assist apparatus first makes a takeover request to the driver for transition to the manual driving, and waits for a predetermined time. For example, such a technique is disclosed in Japanese Unexamined Patent Application Publication No. 2020-131844.

In a case where the driver responds to the takeover request and holds the steering wheel while the drive assist apparatus is waiting, the drive assist apparatus performs transition from the automatic driving to the manual driving. In a case where the driver does not respond to the takeover request while the drive assist apparatus is waiting, the drive assist apparatus executes an automatic retreat control to thereby cause the own vehicle to retreat to a safe place such as a road shoulder.

SUMMARY

An aspect of the technology provides a vehicle drive assist apparatus to be applied to a vehicle. The vehicle drive assist apparatus includes a traveling environment information acquisition unit, a traveling state information acquisition unit, and a traveling control unit. The traveling environment information acquisition unit is configured to acquire traveling environment information of a region in front of the vehicle. The traveling state information acquisition unit is configured to acquire traveling state information of the vehicle. The traveling control unit is configured to execute an automatic driving control of the vehicle on the basis of the traveling environment information acquired by the traveling environment information acquisition unit and the traveling state information detected by the traveling state information acquisition unit. The traveling control unit includes a malfunction detector and a takeover request processor. The malfunction detector is configured to detect a malfunction in the traveling environment information acquisition unit and the traveling state information acquisition unit. The takeover request processor is configured to execute a takeover request process for manual driving in a case where the malfunction detector detects the malfunction in one or each of the traveling environment information acquisition unit and the traveling state information acquisition unit while the vehicle is caused to travel by the automatic driving control. The takeover request processor includes a waiting time measurement section and an output restricting section. The waiting time measurement section is configured to measure a waiting time from a timing when the malfunction detector detects the malfunction to a timing when transition to the manual driving is achieved. The output restricting section is configured to restrict an output of a drive source of the vehicle with respect to an amount of an acceleration operation performed by a driver who drives the vehicle during the waiting time in a case where the malfunction detector detects the malfunction in the traveling environment information acquisition unit.

An aspect of the technology provides a vehicle drive assist apparatus to be applied to a vehicle. The vehicle drive assist apparatus includes a traveling environment sensor, a traveling state sensor, and circuitry. The traveling environment sensor is configured to acquire traveling environment information of a region in front of the vehicle. The traveling state sensor is configured to acquire traveling state information of the vehicle. The circuitry is configured to execute an automatic driving control of the vehicle on the basis of the traveling environment information acquired by the traveling environment sensor and the traveling state information detected by the traveling state sensor. The circuitry is configured to detect a malfunction in the traveling environment sensor or the traveling state sensor. The circuitry is configured to execute a takeover request process for manual driving in a case where the malfunction is detected in one or each of the traveling environment sensor and the traveling state sensor while the vehicle is caused to travel by the automatic driving control. The circuitry is configured to measure a waiting time from a timing when the malfunction is detected to a timing when transition to the manual driving is achieved. The circuitry is configured to restrict an output of a drive source of the vehicle with respect to an amount of an acceleration operation performed by a driver who drives the vehicle during the waiting time in a case where the malfunction is detected in the traveling environment sensor.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 6A:
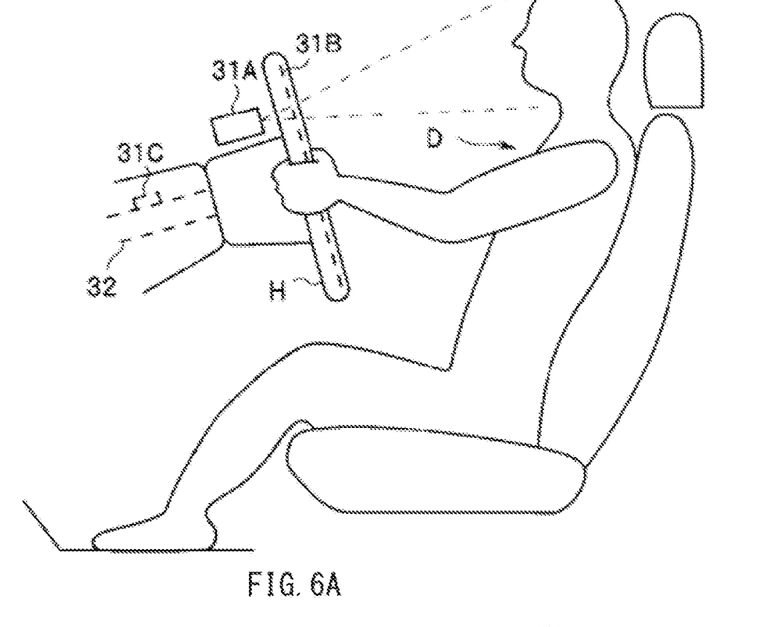
FIG. 6A is a side view of an example of a posture of a driver in a manual driving mode.

In a case where a drive assist apparatus is executing a drive assist control such as an adaptive cruise control (ACC) or an active lane keep (ALK) control, a driver D is requested to constantly hold a steering wheel H and keep a driving posture to look at the front, although the driver D is allowed to put his or her feet directly on a floor mat, as illustrated in FIG. 6A.

Figure 6B:
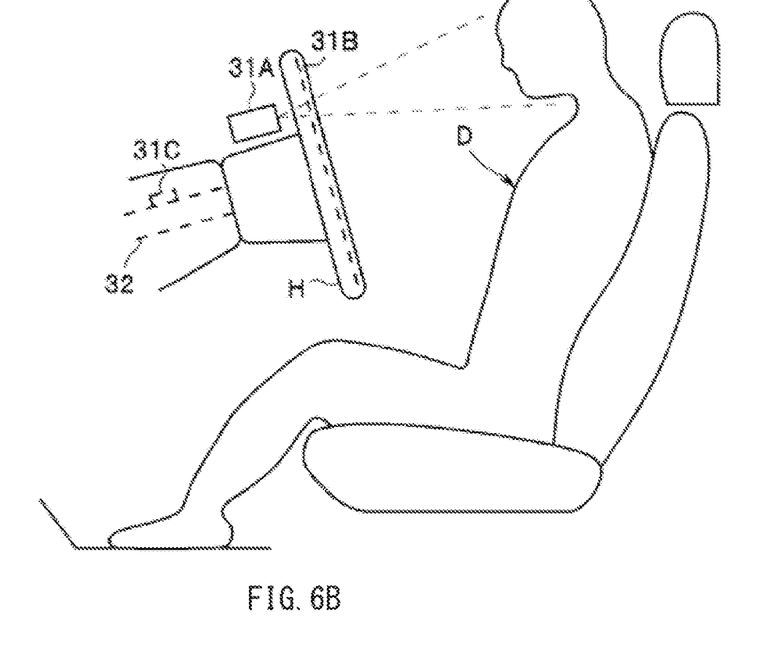
FIG. 6B is a side view of an example of a posture of the driver in an automatic driving mode.

In contrast, while a vehicle is traveling on the basis of automatic driving, i.e., so-called fully automatic driving, the driver D is allowed to perform a second task. The driver D is therefore allowed to sit on a driver seat in a relaxed posture with his or her hands away from the steering wheel H as illustrated in FIG. 6B.

The driver D in such a relaxed posture tends to move slowly. When the drive assist apparatus notifies the driver D of transition to manual driving, the driver D may worry that an automatic retreat control is to be executed unless he or she responds immediately, and try to hold the steering wheel H in a hurry.

In this situation, if the driver D unintentionally presses an accelerator pedal, the drive assist apparatus may mistakenly determine the driver's operation as an overdrive. In such a case, the vehicle may suddenly accelerate, which is not intended by the driver D. For example, in a case where the transition from the automatic driving to the manual driving is due to a malfunction in a traveling environment information acquisition unit that acquires traveling environment information of a front region of the own vehicle, it is difficult for the drive assist apparatus to recognize a preceding vehicle. Therefore, the sudden acceleration of the own vehicle may confuse the driver D.

It is desirable to provide a vehicle drive assist apparatus that, upon performing transition from automatic driving to manual driving due to a malfunction in a traveling environment information acquisition unit that acquires traveling environment information of a front region of an own vehicle, suppresses sudden acceleration not to confuse a driver even if the driver mistakenly presses an accelerator pedal.

Figure 5:
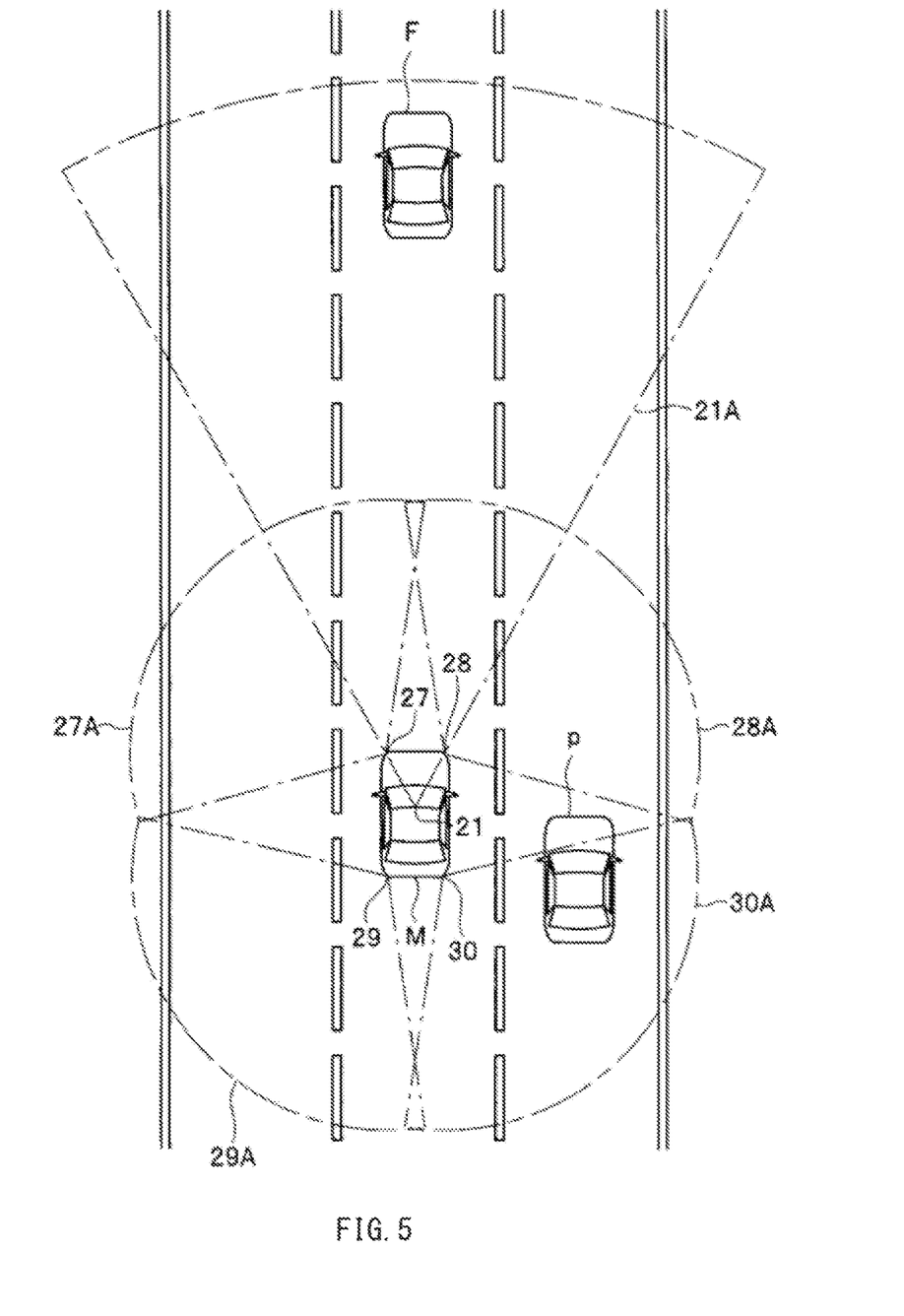
FIG. 5 is a schematic diagram illustrating an example of recognition regions of sensors that acquire traveling environment information around an own vehicle.

Some example embodiments of the technology are described below with reference to the accompanying drawings. Note that the following description is directed to illustrative examples of the disclosure and not to be construed as limiting the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description. In FIG. 5, a sign M denotes an own vehicle traveling on a traveling lane, a sign P denotes a vehicle traveling on an adjacent lane, i.e., a passing lane, and a sign F denotes a preceding vehicle traveling immediately in front of the own vehicle M.

Figure 1:
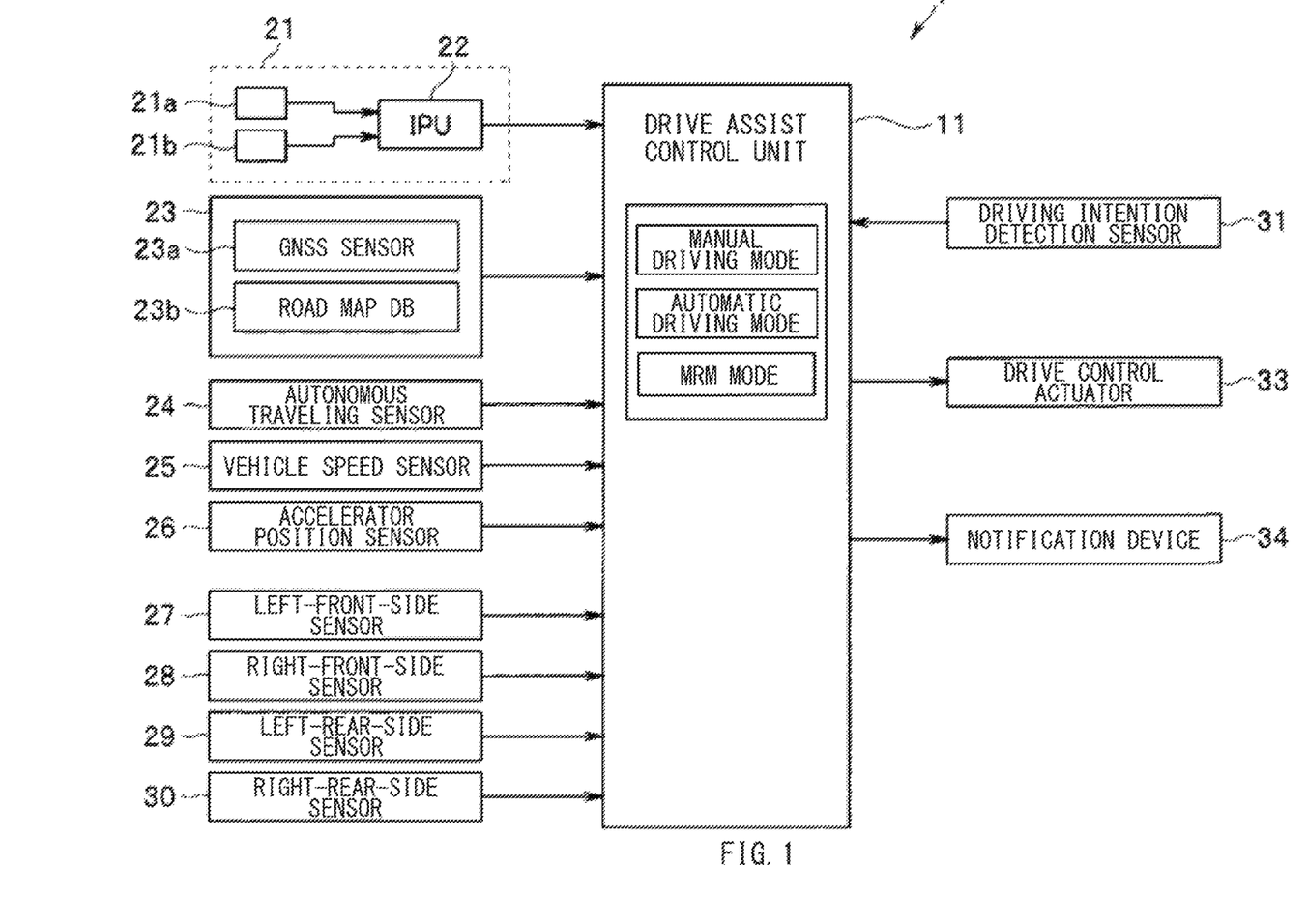
FIG. 1 is a diagram illustrating an example of an overall configuration of a drive assist apparatus according to an embodiment of the technology.

A drive assist apparatus 1 illustrated in FIG. 1 may be mounted on the own vehicle M. The drive assist apparatus 1 may include a drive assist control unit 11. In one embodiment, the drive assist control unit 11 may serve as a "traveling control unit". The drive assist control unit 11 may include: a microcomputer including, without limitation, a central processing unit (CPU), a read-only memory (ROM), and a random-access memory (RAM); and a peripheral device thereof. The ROM may have, for example, a control program for achieving operation set for each system and fixed data such as a data table that have been stored therein.

The drive assist control unit 11 may set a driving mode and perform corresponding drive assistance. The drive assist control unit 11 may have a manual driving mode, an automatic driving mode, and a minimum risk maneuver (MRM) mode as driving modes. Among these driving modes, the automatic driving mode and the manual driving mode may be selected by the driver D as desired.

Also in a case where the driver D has selected the manual driving mode, if various sensors are normally operating, the drive assist control unit 11 may be able to execute various drive assist controls including, without limitation, a known advanced emergency braking (AEB) control, an ACC, an ALK control, and a lane departure prevention (LDP) control.

In the automatic driving mode, the drive assist control unit 11 may perform map matching on a road map of a road map database 23b on the basis of own vehicle position information acquired by a global navigation satellite system (GNSS) sensor 23a of a map locator unit 23. Further, the drive assist control unit 11 may cause the own vehicle M to autonomously travel along a preset target traveling path in a zone in which the automatic driving is allowed. In this case, the own vehicle M may perform handfree traveling and the driver D may be allowed to perform a second task. The map locator unit 23, the GNSS sensor 23a, and the road map database 23b will be described later.

In the MRM mode, the drive assist control unit 11 may cause the own vehicle M to automatically stop at a safe place such as a road shoulder in a case where the drive assist control unit 11 determines that it is difficult to perform traveling in the automatic driving mode and also determines that takeover of the driving mode from the automatic driving mode to the manual driving mode is not to be achieved.

Sensors used in acquiring traveling state information, including a position and a direction, of the own vehicle M and executing the automatic driving mode may be coupled to an input side of the drive assist control unit 11. Such sensors are hereinafter collectively referred to as "automatic driving sensors". In one embodiment, the automatic driving sensors may serve as a "traveling state information acquisition unit". According to the example embodiment, as the automatic driving sensors, a front-region recognition sensor 21, the map locator unit 23, an autonomous traveling sensor 24, a vehicle speed sensor 25, an accelerator position sensor 26, a left-front-side sensor 27, a right-front-side sensor 28, a left-rear-side sensor 29, and a right-rear-side sensor 30 may be provided. In one embodiment, the front-region recognition sensor 21 may serve as a "traveling environment information acquisition unit". The vehicle speed sensor 25 may detect a vehicle speed, i.e., an own vehicle speed. The accelerator position sensor 26 may detect an amount of an accelerator pedal operation, e.g., an accelerator position θacc. Further, a driving intention detection sensor 31 may be also provided. The driving intention detection sensor 31 may be used to confirm the intention of the driver D in a case where the transition of the driving mode from the automatic driving mode to the manual driving mode is to be performed due to a malfunction of any of the automatic driving sensors. The malfunction can be a temporary defect, for example.

The front-region recognition sensor 21 may be an image sensor. The front-region recognition sensor 21 may include a stereo camera and an image processing unit (IPU) 22. The stereo camera may include a main camera 21a and a sub-camera 21b. The two cameras, i.e., the main camera 21a and the sub-camera 21b may be disposed horizontally at respective positions that have substantially the same distance in a left-right direction to the middle of a vehicle width direction in a region near a windshield and above an inside rear view mirror in a front portion of a vehicle compartment, for example. The front-region recognition sensor 21 may cause the IPU 22 to perform predetermined image processing on traveling environment information of a predetermined imaging region 21A (see FIG. 5) in front of the own vehicle M that has been captured and acquired by the two cameras, i.e., the main camera 21a and the sub-camera 21b. Thereafter, the front-region recognition sensor 21 may supply the processed traveling environment information to the drive assist control unit 11.

The map locator unit 23 may include the GNSS sensor 23a and the road map database 23b. The GNSS sensor 23a may receive positioning signals transmitted from a plurality of positioning satellites to acquire position coordinates of the own vehicle M. The road map database 23b may be a large-capacity storage medium such as a hard disk drive (HDD), and may have known road map information stored therein. The stored road map information may include information to be used in executing the automatic driving. Non-limiting examples of such information may include types of roads (e.g., a general road, an arterial road, and an expressway), a road shape, a road direction, the number of lanes, and a lane width. The drive assist control unit 11 may perform map matching of the position coordinates (e.g., a longitude, a latitude, and an altitude) acquired by the GNSS sensor 23a on the road map information stored in the road map database 23b. The drive assist control unit 11 may thereby estimate the own vehicle position, i.e., the current location, on the road map. In a case where the own vehicle M is traveling on a multi-lane road, the drive assist control unit 11 may also estimate which lane the own vehicle M is traveling on.

The autonomous traveling sensor 24 may be adapted to detect a traveling direction of the own vehicle M to allow for autonomous traveling in an environment where effective reception of a positional signal is inhibited due to a decrease in sensitivity for reception of a signal from the GNSS satellites. Such an environment may be, for example, in a tunnel. The autonomous traveling sensor 24 may include, for example but not limited to, a yaw rate sensor and a longitudinal acceleration sensor. That is, the drive assist control unit 11 may calculate a traveling distance and a traveling direction of the own vehicle M on the basis of, for example but not limited to: a vehicle speed detected by the vehicle speed sensor 25; a yaw rate or a yaw angular velocity detected by the yaw rate sensor included in the autonomous traveling sensor 24; and a longitudinal acceleration detected by the longitudinal acceleration sensor. Further, the drive assist control unit 11 may perform map matching of the calculated traveling distance and the traveling direction of the own vehicle M on the road map information stored in the road map database 23b to thereby estimate the current position of the own vehicle M.

Each of the side sensors, i.e., the left-front-side sensor 27, the right-front-side sensor 28, the left-rear-side sensor 29, and the right-rear-side sensor 30, may include a millimeter-wave radar, a microwave radar, a light detection and ranging (LiDAR), or any other suitable device. The left-front-side sensor 27, the right-front-side sensor 28, the left-rear-side sensor 29, and the right-rear-side sensor 30 may each receive a reflection wave from a target object to detect a distance and a direction from the own vehicle M to the target object. As illustrated in FIG. 5, the left and right front-side sensors, i.e., the left-front-side sensor 27 and the right-front-side sensor 28, may be disposed at left and right ridges of a front bumper, respectively, for example. The left and right rear-side sensors, i.e., the left-rear-side sensor 29 and the right-rear-side sensor 30, may be disposed at left and right ridges of a rear bumper, respectively, for example. The left and right front-side sensors, i.e., the left-front-side sensor 27 and the right-front-side sensor 28, may scan a fan-shape region (scanning region) 27A obliquely expanding from the front-left to the side of the own vehicle M and a fan-shape region (scanning region) 28A obliquely expanding from the front-right to the side of the own vehicle M, respectively. The left and right rear-side sensors, i.e., the left-rear-side sensor 29 and the right-rear-side sensor 30, may scan a fan-shape region (scanning region) 29A expanding from the rear to the left of the own vehicle M and a fan-shape region (scanning region) 30A expanding from the rear to the right of the own vehicle M, respectively. The fan-shape regions 29A and 30A may be regions which the front-side sensors, i.e., the left-front-side sensor 27 and the right-front-side sensor 28, are not able to scan. The side sensors, i.e., the left-front-side sensor 27, the right-front-side sensor 28, the left-rear-side sensor 29, and the right-rear-side sensor 30, may thus detect a target object such as the adjacent vehicle P traveling on the adjacent lane.

The left and right front-side sensors, i.e., the left-front-side sensor 27 and the right-front-side sensor 28, may be configured to detect an obstacle including the preceding vehicle F in front of the own vehicle M to some extent. Therefore, for example, in a case where the cameras of the front-region recognition sensor 21, i.e., the main camera 21a and the sub-camera 21b, malfunction while the own vehicle M is traveling in the automatic driving mode, the left and right front-side sensors, i.e., the left-front-side sensor 27 and the right-front-side sensor 28, may be able to perform detection of obstacles instead of the cameras of the front-region recognition sensor 21 although accuracy of the detection may be lowered. Further, by performing map matching of the position coordinates of the own vehicle M acquired by the GNSS sensor 23a of the map locator unit 23 on the road map information stored in the road map database 23b, it may be possible to continue the automatic driving to some extent.

The driving intention detection sensor 31 may be adapted to check whether the driver D has an intention to perform driving by himself or herself upon transition of the driving mode from the automatic driving mode to the manual driving mode. The driving intention detection sensor 31 may be disposed separately from the above-described automatic driving sensors.

As illustrated in FIGS. 6A and 6B, non-limiting examples of the driving intention detection sensor 31 may include a driver monitoring system (DMS) 31A, a steering-wheel touch sensor 31B, and a steering torque sensor 31C. The DMS 31A may monitor a position of a face or facial expression of the driver D. The steering-wheel touch sensor 31B may be provided on the steering wheel H. The steering torque sensor 31C may detect steering torque from a position of a steering shaft 32. In one embodiment, the DMS 31A may serve as a "direction determination unit". In one embodiment, the steering-wheel touch sensor 31B or the steering torque sensor 31C may serve as a "holding detection unit".

According to the example embodiment, the driving intention detection sensor 31 may include the DMS 31A and the steering-wheel touch sensor 31B or the steering torque sensor 31C.

The drive assist control unit 11 may check whether the face of the driver D is directed to the front on the basis of an image captured by the DMS 31A. Further, the drive assist control unit 11 may check whether the driver D is holding the steering wheel H on the basis of an output from the steering-wheel touch sensor 31B or the steering torque sensor 31C.

In a case where the driver D is determined as facing the front on the basis of the image captured by the DMS 31A, and where the driver D is determined as holding the steering wheel H on the basis of the output from the steering-wheel touch sensor 31B or the steering torque sensor 31C, the drive assist control unit 11 may determine that the driver D has the intention to perform driving. In a case where the driver D is determined as not facing the front on the basis of the image captured by the DMS 31A, and where the driver D is determined as not holding the steering wheel H on the basis of the output from the steering-wheel touch sensor 31B or the steering torque sensor 31C, the drive assist control unit 11 may determine that the intention of the driver D to perform driving cannot be confirmed.

Coupled to an output side of the drive assist control unit 11 may be a drive control actuator 33 and a notification device 34. The drive control actuator 33 is a collective term for actuators that assist the traveling state of the own vehicle M including, without limitation, a power actuator, an electric power steering (EPS) actuator, and a brake actuator. The power actuator may be adapted to control an output of a drive source such as an engine or an electric motor. The EPS actuator may be adapted to control driving of an EPS motor. The brake actuator may adjust a hydraulic pressure applied to a brake wheel cylinder provided on each wheel. The notification device 34 may notify the driver D of a driving takeover request by means of a buzzer sound, an audio voice, monitor display, or the like upon the transition of the driving mode to the manual driving mode.

The drive assist control unit 11 may recognize a front obstacle on the basis of the traveling environment information supplied from the front-region recognition sensor 21, and execute a drive assist control such as the ACC or the AEB control. The front obstacle may include the preceding vehicle F to be followed by the own vehicle M. In a case where the own vehicle M is caused to travel in the automatic driving mode, the drive assist control unit 11 may substantially constantly monitor the outputs from the automatic driving sensors. In a case where a malfunction in the automatic driving sensors is detected, the drive assist control unit 11 may notify the driver D of the detection of the malfunction, and perform transition of the driving mode from the automatic driving mode to the manual driving mode. The above-mentioned malfunction can be a temporary defect, for example.

However, sudden transition of the driving mode from the automatic driving mode to the manual mode may confuse the driver D. Therefore, a takeover waiting time Co may be set. The drive assist control unit 11 may allow the driver D to take over the driving within the takeover waiting time Co, and thereafter perform the transition of the driving mode to the manual driving mode. Accordingly, the drive assist control unit 11 may allow the automatic driving to be continued for the takeover waiting time Co at maximum. In such a case, the automatic driving may be continued with restriction. For example, the upper limit of the own vehicle speed may be set.

Figure 2:
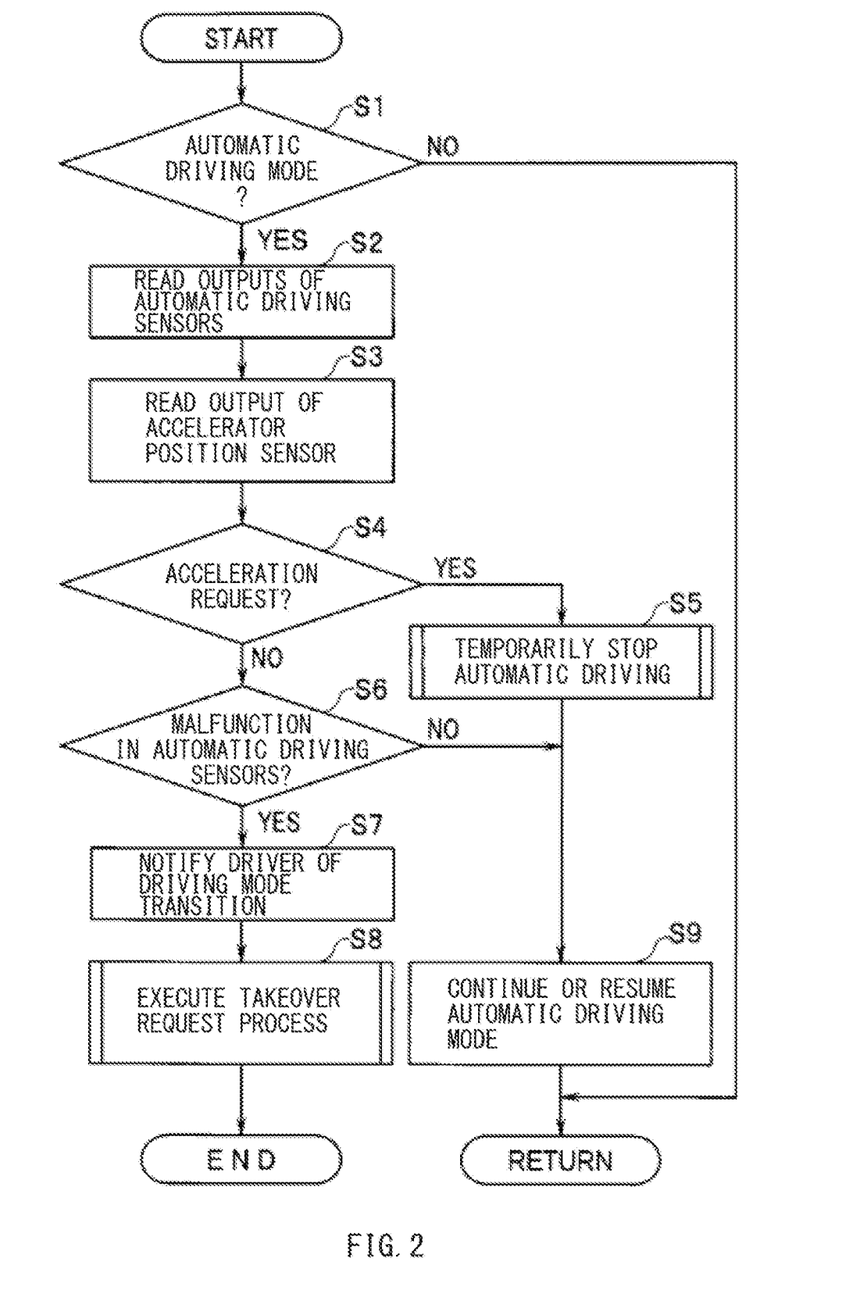
FIG. 2 is a flowchart illustrating an example of a driving mode takeover control routine.

The drive assist control unit 11 may execute the transition of the driving mode while executing the automatic driving mode, in accordance with a driving mode transition control routine illustrated in FIG. 2.

The driving mode transition control routine may be activated every predetermined calculation cycle. First, in step S1, the drive assist control unit 11 may check whether the automatic driving mode is selected as the driving mode of the own vehicle M. In a case where the automatic driving mode is not selected (NO in step S1), the process may be caused to exit the routine, and the drive assist control unit 11 may wait until the automatic driving mode is selected. In a case where the automatic driving mode is selected (YES in step S1), the process may be caused to proceed to step S2.

In step S2, the drive assist control unit 11 may read the outputs of the sensors, e.g., the automatic driving sensors, that detect parameters to be used in executing the automatic driving mode. The automatic driving sensors have already been described above and therefore will not be described further here. Thereafter, the process may be caused to proceed to step S3. In step S3, the drive assist control unit 11 may read the accelerator position (the acceleration operation amount) $\theta acc$ which is the output from the accelerator position sensor 26.

Thereafter, the process may be caused to proceed to step S4. In step S4, the drive assist control unit 11 may check whether an acceleration request is made, i.e., whether the accelerator pedal is being pressed, on the basis of the accelerator position $\theta acc$ detected in step S2. In a case where the accelerator pedal is being pressed, the drive assist control unit 11 may determine that the acceleration request is made (YES in step S4), and the process may be caused to branch to step S5. In a case where the accelerator position $\theta acc$ is substantially 0 (zero) degrees, indicating an accelerator pedal released (non-pressed) state (NO in step S4), the process may be caused to proceed to step S6.

In step S5, the drive assist control unit 11 may temporarily stop the automatic driving and execute an acceleration control. The acceleration control may be performed in accordance with an unillustrated acceleration control sub-routine. In the acceleration control sub-routine, the drive assist control unit 11 may set a target vehicle speed on the basis of the accelerator position $\theta acc$ detected by the accelerator position sensor 26, set an acceleration for causing the own vehicle speed to reach the set target vehicle speed, and perform a feedback control to thereby cause the own vehicle speed to reach the target vehicle speed. When the driver D releases the accelerator pedal that has been pressed, and the accelerator position θacc detected by the accelerator position sensor 26 becomes a predetermined position or less, the process may be caused to exit the sub-routine and proceed to step S8.

In step S6, the drive assist control unit 11 may check whether a malfunction is occurring, on the basis of output values from the automatic driving sensors read in step S2. The malfunction can be disconnection, for example. In a case where an output abnormality is detected in any of the automatic driving sensors, the drive assist control unit 11 may determine that the malfunction is occurring (YES in step S6), and the process may be caused to proceed to step S7. In a case where all of the output values from the automatic driving sensors are normal (NO in step S6), the process may be caused to jump to step S9. In one embodiment, the process in step S6 may serve as a process performed by a "malfunction detector".

In step S7, the drive assist control unit 11 may drive the notification device 34 to thereby notify the driver D that the transition of the driving mode from the automatic driving mode to the manual driving mode is to be performed, and the process may be caused to proceed to step S8. The notification device 34 may notify the driver D of the transition to the manual driving mode by means of, for example but not limited to, a buzzer sound, an audio voice, or monitor display. In this case, to notify the driver D of the transition to the manual driving mode, the notification device 34 may cause a signal light, which is disposed on an instrument panel and indicates the execution of automatic driving, to flash or to turn red and attract attention.

In step S8, the drive assist control unit 11 may execute a takeover request process to perform the transition of the driving mode to the manual driving mode, and end the routine. In a case where the process proceeds from step S6 to step S9, the drive assist control unit 11 may continue the automatic driving mode, and the process may be caused to exit the routine. In a case where the process proceeds from step S5 to step S9, the drive assist control unit 11 may resume the automatic driving mode, and the process may be caused to exit the routine.

Figure 3:
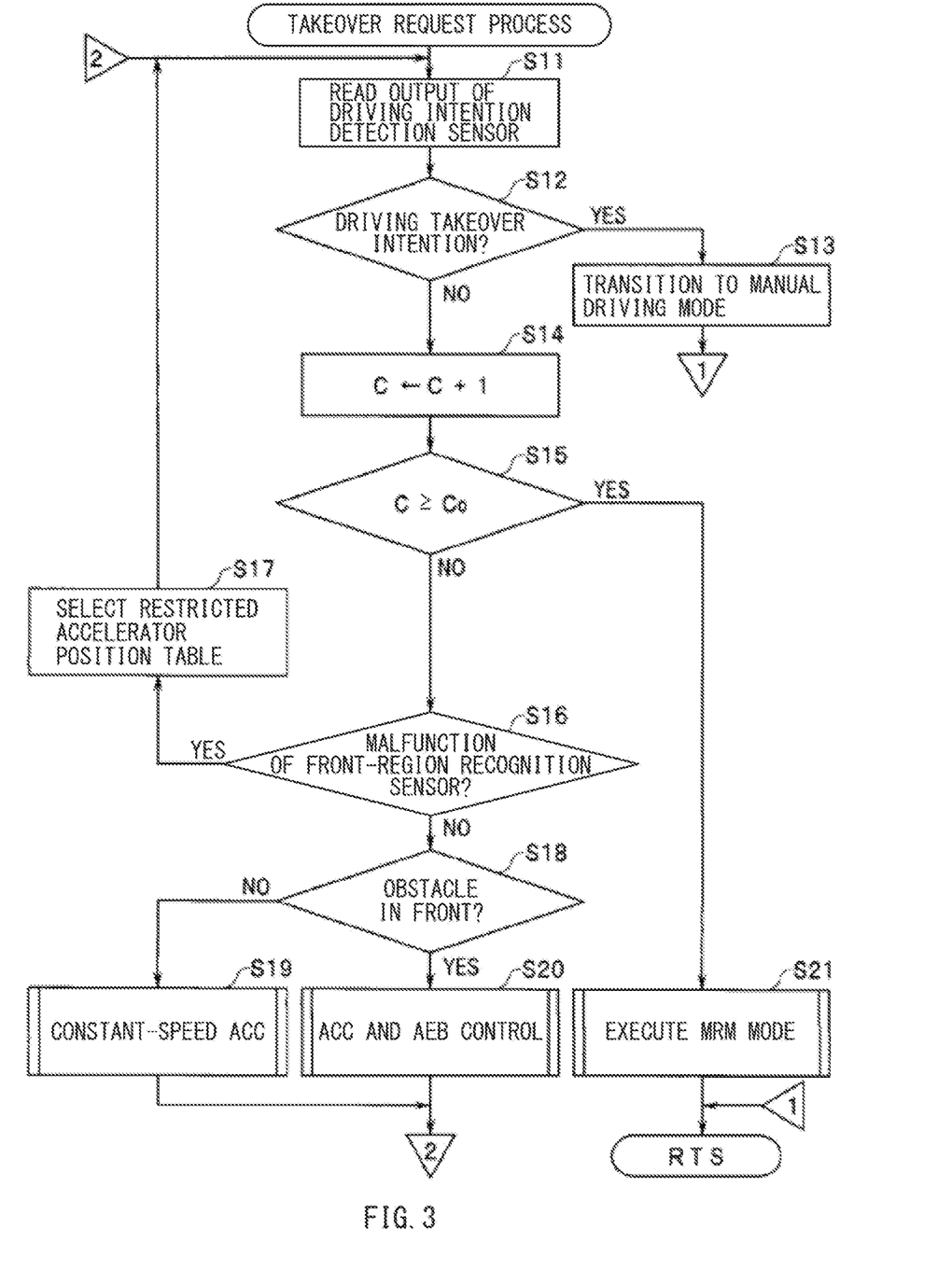
FIG. 3 is a flowchart illustrating an example of a takeover request process sub-routine.

The takeover request process in step S8 may be executed in accordance with a takeover request process sub-routine illustrated in FIG. 3. In one embodiment, the process in the takeover request process sub-routine may serve as a process performed by a "takeover request processor".

In the takeover request process sub-routine illustrated in FIG. 3, first, in step S11, the drive assist control unit 11 may read an output value from the driving intention detection sensor 31. As described above, according to the example embodiment, the driving intention detection sensor 31 may include a combination of the DMS 31A and the steering-wheel touch sensor 31B or the steering torque sensor 31C.

Thereafter, the process may be caused to proceed to step S12. In step S12, the drive assist control unit 11 may determine whether the driver D has an intention to take over the driving of the own vehicle M, on the basis of the output value from the driving intention detection sensor 31. The drive assist control unit 11 may determine that the driver D has the intention to take over the driving of the own vehicle M in a case where: the driver is determined as facing the front on the basis of the image captured by the DMS 31A; where the steering-wheel touch sensor 31B is turned on; or where small steering torque generated when the driver D holds the steering wheel H is detected by the steering torque sensor 31C.

In one example, the drive assist control unit 11 may count the time during which the steering-wheel touch sensor 31B is being turned on or during which the small steering torque generated when the driver D holds the steering wheel H is being detected by the steering torque sensor 31C, or any other time. In this example, the drive assist control unit 11 may determine that the driver D has the intention to take over the driving of the own vehicle M in a case where the value of the counted time is a predetermined value or greater, i.e., a predetermined time or more.

In contrast, in a case: where the driver is determined as not facing the front on the basis of the image captured by the DMS 31A; where the steering-wheel touch sensor 31B is turned off; or where steering torque is not detected by the steering torque sensor 31C, the drive assist control unit 11 may determine that the intention of the driver D to take over the driving of the own vehicle M cannot be confirmed.

In a case where the driver D is determined as having the intention to take over the driving in step S12 (YES in step S12), the process may be caused to branch to step S13. In a case where the intention of the driver D to take over the driving of the own vehicle M is determined as not being confirmed in step S12 (NO in step S12), the process may be caused to proceed to step S14. In one embodiment, the processes in step S11 and S12 may serve as a process performed by an "intention determination section".

In step S13, the drive assist control unit 11 may perform transition of the driving mode from the automatic driving mode to the manual driving mode, and end the routine. As a result, the automatic driving may be canceled, and the driver D may cause the own vehicle M to travel by performing a steering-wheel operation and an acceleration operation by himself or herself. In a case where the malfunction in the automatic driving sensors is a temporary defect and the automatic driving sensors recover to the normal state during the execution of the manual driving mode, for example, the recovery of the automatic driving sensors may be presented on a multi-information display disposed on the instrument panel. In this case, the driver D may be able to execute the automatic driving mode again by turning on an automatic driving switch. In one embodiment, the process in step S13 may serve as a process performed by a "manual driving transition section".

In step S14, the drive assist control unit 11 may increment a count value C of a counter timer (C←C+1), and measure a waiting time. Thereafter, the process may be caused to proceed to step S15. An initial value of the count value C may be 0 (zero). For example, according to the example embodiment, the takeover waiting time Co may be set to a value corresponding to about 8 seconds to 12 seconds.

In step S15, the drive assist control unit 11 may compare the count value C and the takeover waiting time Co with each other. The takeover waiting time Co may be the maximum allowable waiting time for the transition of the driving mode from the automatic driving mode to the manual driving mode. The takeover waiting time Co may be calculated for each vehicle model on the basis of experiments or the like and set in advance.

As described above, while the own vehicle M is traveling in the automatic driving mode, the driver D may be allowed to perform a second task. Therefore, as illustrated in FIG. 6B, the driver D may be sitting on the driver's seat in a relaxed posture with his or her hands away from the steering wheel H. The driver D in such a relaxed posture tends to move slowly. Therefore, when the drive assist control unit 11 notifies the driver D of the transition of the driving mode to the manual driving mode, it may be difficult for the driver D to respond immediately. For such a reason, it may be necessary to provide some time for the transition of the driving mode to the manual driving mode.

Accordingly, in the takeover waiting time Co, even if any of the automatic driving sensors malfunctions, the automatic driving may be continued with restriction on the basis of signals obtained from other normally operating sensors. Non-limiting examples of the restriction may include limitation of the own vehicle speed.

In a case where the count value C is less than the takeover waiting time Co (C<Co, NO in step S15), the process may be caused to proceed to step S16 while the drive assist control unit 11 continues to wait. In a case where the count value C is greater than or equal to the takeover waiting time Co (C≥Co, YES in step S15), the drive assist control unit 11 may determine that the driver D does not have the intention to take over the driving. Thereafter, the process may be caused to jump to step S21. In one embodiment, the processes in step S14 and S15 may serve as a process performed by a "waiting time measurement section".

In step S16, the drive assist control unit 11 may check whether the front-region recognition sensor 21 included in the automatic driving sensors is malfunctioning, on the basis of the outputs from the automatic driving sensors. In a case where the front-region recognition sensor 21 is determined as being malfunctioning (YES in step S16), the process may be caused to branch to step S17. In a case where the front-region recognition sensor 21 is determined as being operating normally (NO in step S16), the process may be caused to proceed to step S18.

In step S17, the drive assist control unit 11 may select a restricted accelerator position table as an accelerator position table to refer to during the takeover waiting time Co. Thereafter, the process may be caused to return to step S11. Note that the referencing to the restricted accelerator position table selected in step S17 by the drive assist control unit 11 may restrict the output of the drive source with respect to the accelerator position θ, i.e., the accelerator operation amount. In one embodiment, the process in this step may serve as a process performed by an "output restricting section".

Figure 4A:
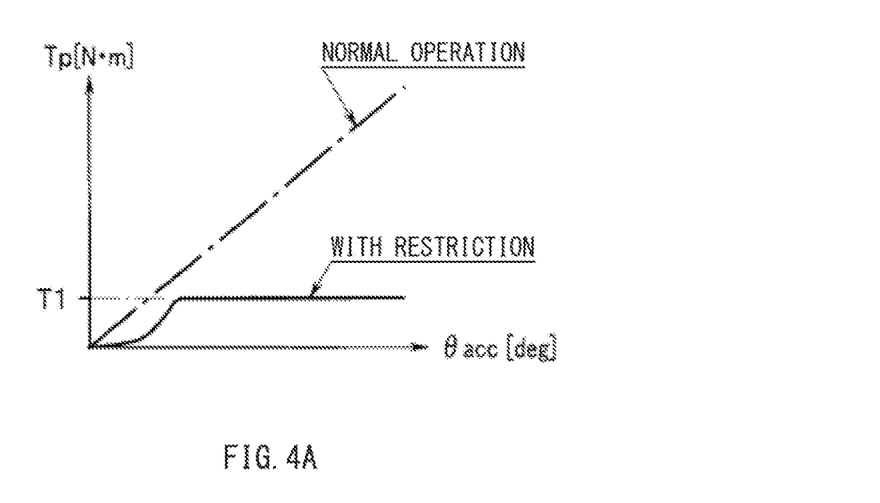
FIG. 4A is a conceptual diagram illustrating an example of an accelerator position table based on a torque control.
Figure 4B:
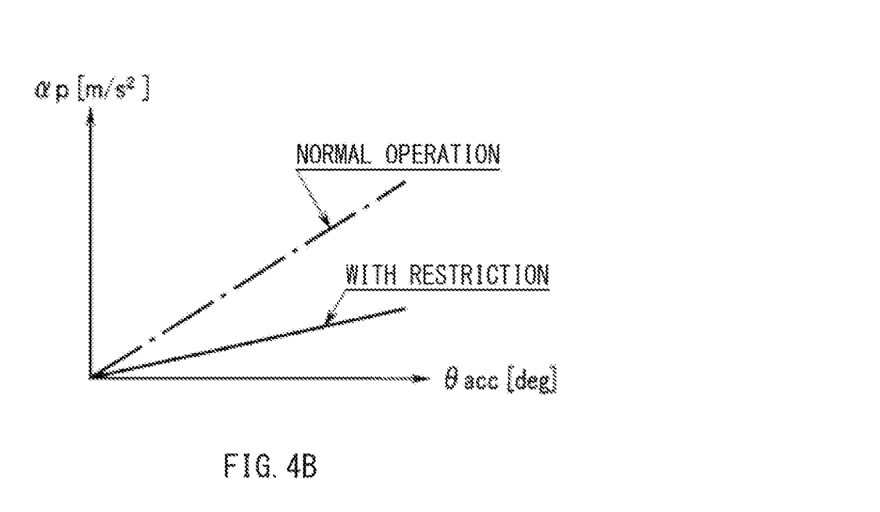
FIG. 4B is a conceptual diagram illustrating an example of an accelerator position table based on an acceleration control.

FIGS. 4A and 4B each illustrate a characteristic of an accelerator position table for reference in a case of normal operation and a characteristic of a restricted accelerator position table for reference in a case of a malfunction of the front-region recognition sensor 21.

While the own vehicle M is traveling in the automatic driving mode, the driver D may be allowed to perform a second task with his or her feet being away from the accelerator pedal and directly on the floor mat. In such a situation, if the notification device 34 notifies the driver D of the transition of the driving mode to the manual driving mode, the driver D may be confused and mistakenly press the accelerator pedal.

In this case, even in the takeover waiting time Co, the automatic driving may be temporarily stopped and the own vehicle M may accelerate basically when the driver D presses the accelerator pedal.

In the accelerator position table for reference in the case of normal operation, a usually obtainable output characteristic of the drive source with respect to the accelerator position θacc may be set. In contrast, in the restricted accelerator position table, a restricted output characteristic of the drive source with respect to the accelerator position θacc may be set. An output control of the drive source associated with the accelerator position θacc may include a control based on target drive torque Tp as illustrated in FIG. 4A and a control based on a target acceleration αp as illustrated in FIG. 4B.

In the control based on the target drive torque Tp illustrated in FIG. 4A, the characteristic of the accelerator position table for reference in the case of normal operation may have a 1:1 correspondence between the accelerator position θacc and the target drive torque Tp as indicated by a dot-chain line. In the characteristic of the restricted accelerator position table indicated by a solid line in this case, while the accelerator position θacc increases, the target drive torque Tp may gradually increase until the target drive torque Tp reaches a set drive torque T1, and be kept constant after reaching the set drive torque T1 regardless of the increase in the accelerator position θacc. Therefore, in accordance with the restricted accelerator position table, the own vehicle M may be prevented from sudden acceleration even if the driver D mistakenly presses the accelerator pedal.

In contrast, in the control based on the target acceleration αp illustrated in FIG. 4B, the accelerator position θacc and the target acceleration αp may be almost proportional to each other. The characteristic of the accelerator position table for reference in the case of normal operation may have a 1:1 correspondence between the accelerator position θacc and the target acceleration αp as indicated by a dot-chain line. In the characteristic of the restricted accelerator position table indicated by a solid line in this case, the characteristic may have a slope set to be smaller. Therefore, in accordance with the restricted accelerator position table, the own vehicle M may be prevented from sudden acceleration even if the driver D mistakenly presses the accelerator pedal.

In a case where the front-region recognition sensor 21 is operating normally, even if the driver D presses the accelerator pedal, a control such as the known ACC or the known AEB control may be activated. Therefore, in a situation where the own vehicle M is approaching an obstacle in the front including the preceding vehicle F, it is possible to avoid contact between the own vehicle M and the obstacle in the front. Accordingly, the accelerator position table for reference in the case of normal operation may be applied as it is also in the takeover waiting time Co.

In contrast, in a case where the front-region recognition sensor 21 is malfunctioning, it may be difficult for the drive assist control unit 11 to recognize the obstacle in the front including the preceding vehicle F with high accuracy. Accordingly, it may be difficult to activate a control such as the ACC or the AEB control. To address this, the restricted accelerator position table may be applied to thereby suppress sudden acceleration of the own vehicle M even if the driver D mistakenly presses the accelerator pedal.

In a case where the process proceeds from step S16 to step S18, the drive assist control unit 11 may check, in step S18, whether an obstacle including the preceding vehicle F is detected in the front region, on the basis of the traveling environment information of the front region acquired by the front-region recognition sensor 21. In a case where the obstacle is not detected (NO in step S18), the process may be caused to branch to step S19. In step S19, the drive assist control unit 11 may execute a constant-speed ACC, and the process may be caused to return to step S11. The constant-speed ACC may be a control of causing the own vehicle M to travel at a set vehicle speed set by the driver D. In a case where the obstacle is detected (YES in step S18), the process may be caused to proceed to step S20. In step S20, the drive assist control unit 11 may execute the ACC and the AEB control, and the process may be caused to return to step S11.

In a case where the driver D is determined as not having the intention to take over the driving, and the process is caused to jump from step S15 to step S21, the drive assist control unit 11 may execute the MRM mode in step S21 and end the routine. As a result, the drive assist control unit 11 may cause a hazard lamp to flash, and cause the own vehicle M to automatically retreat to a safe place such as a road shoulder with a lowered own vehicle speed.

Figure 7A:
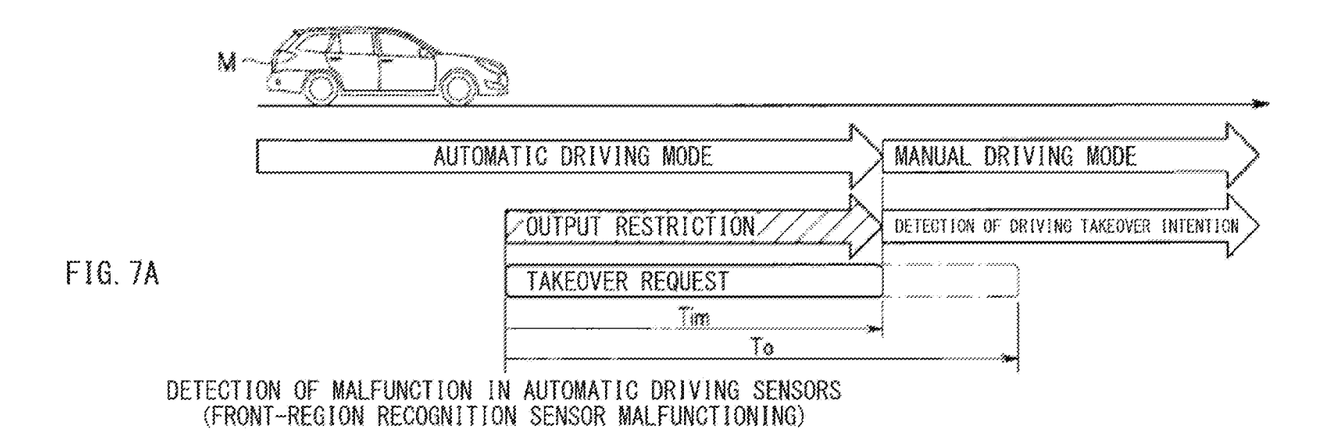
FIG. 7A is a time chart illustrating an example of a control to be performed upon transition of a driving mode to the manual driving mode due to a malfunction of a front-region recognition sensor.
Figure 7B:
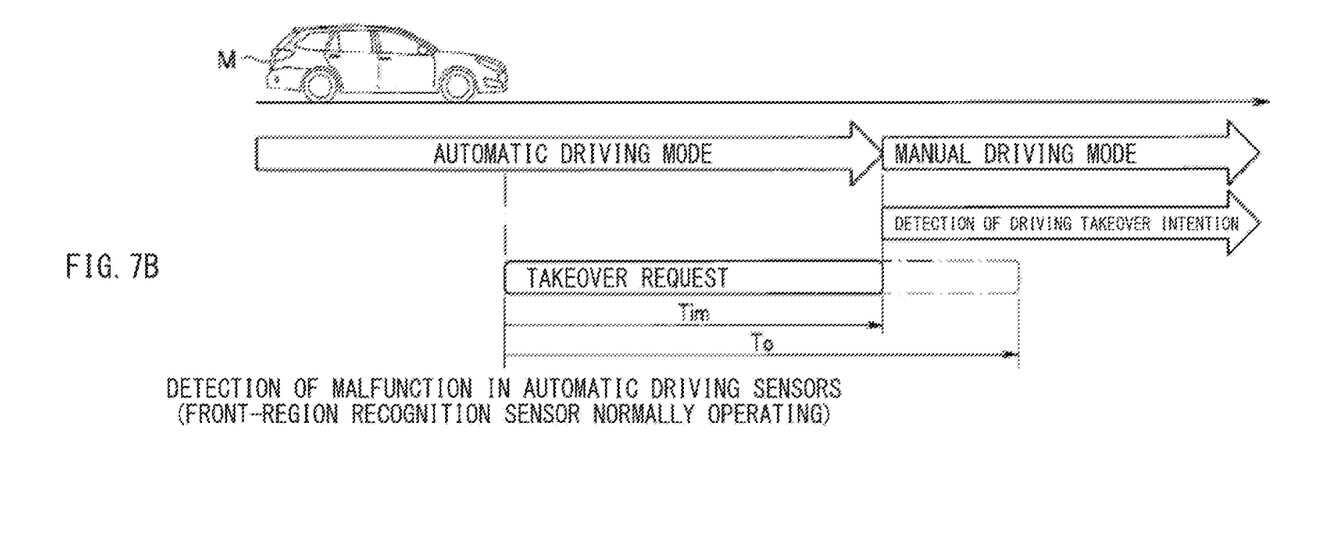
FIG. 7B is a time chart illustrating an example of a control to be performed upon the transition of the driving mode to the manual driving mode due to a malfunction of a sensor other than the front-region recognition sensor.
Figure 8:
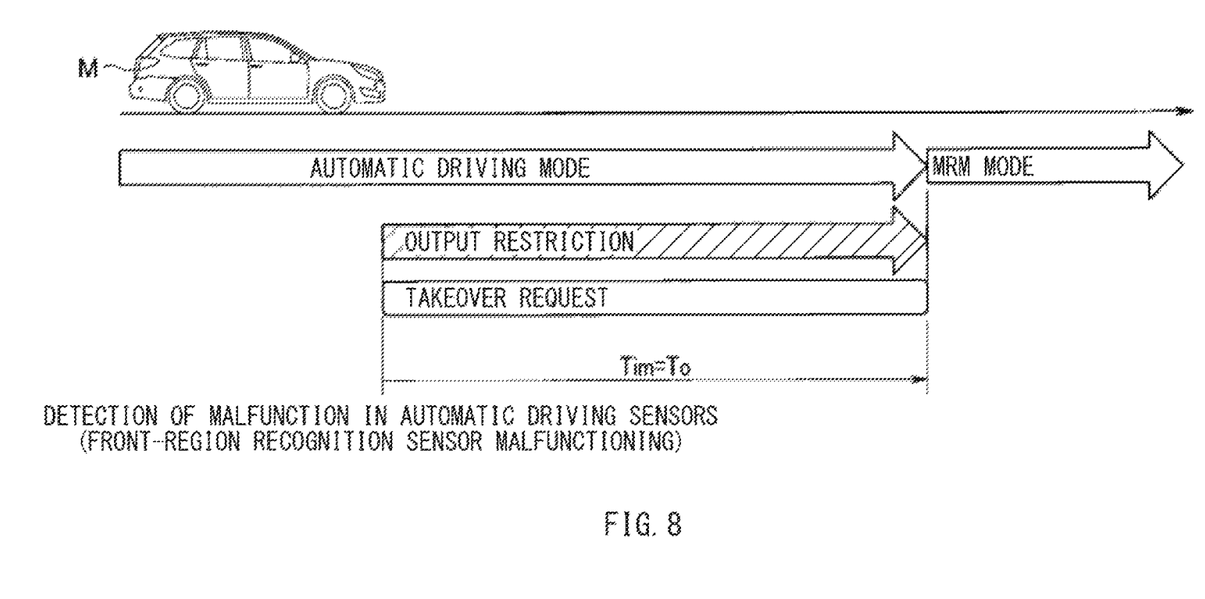
FIG. 8 is a time chart illustrating an example of a control to be performed upon transition of the driving mode to a minimum risk maneuver (MRM) mode.

FIGS. 7A, 7B, and 8 each illustrate an example of transition of the driving mode set in the takeover request process sub-routine. First, with reference to a time chart illustrated in FIG. 7A, an example of a control to be executed in a case where the front-region recognition sensor 21 is malfunctioning is described. In a case where the drive assist control unit 11 detects a malfunction in the automatic driving sensors while the own vehicle M is traveling in the automatic driving mode, the drive assist control unit 11 may notify the driver D of the driving takeover request, and start measuring time with the count value C of the counter timer.

In a case where the malfunction of the automatic driving sensors includes a malfunction of the front-region recognition sensor 21, the drive assist control unit 11 may select the restricted accelerator position table indicated by the solid line in FIG. 4A or 4B to thereby restrict the output of the drive source. Accordingly, sudden acceleration of the own vehicle M is suppressed even if the driver D mistakenly presses the accelerator pedal. Further, in a case where the driver D presents the intention to take over the driving, for example, by looking at the front and holding the steering wheel H, within the takeover waiting time Co (C<Co), the drive assist control unit 11 may perform transition of the driving mode from the automatic driving mode to the manual driving mode.

Next, with reference to a time chart illustrated in FIG. 7B, an example of a control to be executed in a case where any sensor of the automatic driving sensors is malfunctioning but the front-region recognition sensor 21 is operating normally is described. In a case where the drive assist control unit 11 detects a malfunction in the automatic driving sensors while the own vehicle M is traveling in the automatic driving mode, the drive assist control unit 11 may notify the driver D of the driving takeover request, and start measuring time with the count value C of the counter timer. Because the front-region recognition sensor 21 is operating normal, the drive assist control unit 11 may select the accelerator position table for the normal operation indicated by the dot-chain line in FIG. 4A or 4B. In a case where the front-region recognition sensor 21 is operating normally, the front-region recognition sensor 21 may detect an obstacle in the front, and a control such as the ACC or the AEB control may be activated accordingly. As a result, it is possible to avoid interference between the own vehicle M and the obstacle in the front even if the driver D mistakenly presses the accelerator pedal.

Next, with reference to a time chart illustrated in FIG. 8, an example of a control to be executed in a case: where the front-region recognition sensor 21 is malfunctioning; and where the driver D does not present the intention to take over the driving within the takeover waiting time Co is described. As with the above-described case illustrated in FIG. 7A, in a case where the drive assist control unit 11 detects a malfunction in the automatic driving sensors while the own vehicle M is traveling in the automatic driving mode, the drive assist control unit 11 may notify the driver D of the driving takeover request, and start measuring time with the count value C of the counter timer. Further, in a case where the malfunction in the automatic driving sensors includes the malfunction of the front-region recognition sensor 21, the drive assist control unit 11 may restrict the output of the drive source. Further, in a case where the driver D does not present the intention to take over the driving even with the elapse of the takeover waiting time Co (C≥Co), the drive assist control unit 11 may perform transition of the driving mode from the automatic driving mode to the MRM mode.

As described above, according to the example embodiment, upon the transition of the driving mode from the automatic driving mode to the manual driving mode due to the malfunction of the front-region recognition sensor 21, the drive assist control unit 11 may refer to the restricted accelerator position table to restrict the output of the drive source with respect to the accelerator position θacc within the takeover waiting time Co. Therefore, even if the driver D mistakenly presses the accelerator pedal in the takeover waiting time Co, sudden acceleration of the own vehicle M is suppressed. Accordingly, it is possible to obtain a favorable control property without confusing the driver D.

It is to be noted that the embodiment of the technology is not limited to the above-described example embodiment. For example, the front-region recognition sensor 21 may include a combination of a monocular camera and a laser sensor.

According to an embodiment of the technology, in a case where a malfunction detector detects a malfunction of a traveling environment information acquisition unit during automatic driving, an output of a drive source with respect to an amount of an acceleration operation performed by a driver is restricted in a waiting time for transition to manual driving. Therefore, even if the driver mistakenly presses an accelerator pedal in the waiting time, sudden acceleration of an own vehicle is suppressed. As a result, it is possible to avoid confusing the driver.

Each of the drive assist control unit 11 and the IPU 22 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the drive assist control unit 11 and the IPU 22 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the drive assist control unit 11 and the IPU 22 illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle drive assist apparatus to be applied to a vehicle, the vehicle drive assist apparatus comprising:
a traveling environment information acquisition unit comprising a sensor configured to acquire traveling environment information of a region in front of the vehicle;
a traveling state information acquisition unit comprising a sensor configured to acquire traveling state information of the vehicle; and
a traveling control unit configured to execute an automatic driving control of the vehicle on a basis of the traveling environment information acquired by the traveling environment information acquisition unit and the traveling state information detected by the traveling state information acquisition unit,
the traveling control unit including:
a malfunction detector configured to detect a malfunction in the traveling environment information acquisition unit and the traveling state information acquisition unit, and
a takeover request processor configured to execute a takeover request process for manual driving in a case where the malfunction detector detects the malfunction in one or each of the traveling environment information acquisition unit and the traveling state information acquisition unit while the vehicle is caused to travel by the automatic driving control,
the takeover request processor including:
a waiting time measurement section configured to measure a waiting time from a timing when the malfunction detector detects the malfunction to a timing when transition to the manual driving is achieved,
an output restricting section, and
a drive assist control unit, wherein
in response to the malfunction being detected in the traveling environment information acquisition unit, the output restricting section is configured to restrict an output of a drive source of the vehicle to an intermediate value between zero and a requested amount of an acceleration operation in response to receiving an acceleration request during the waiting time, the intermediate value being set based on the requested amount to suppress the requested acceleration, and
in response to the malfunction not being detected in the traveling environment information acquisition unit and no obstacle being detected on a basis of the traveling environment information acquired by the traveling environment information acquisition unit, the drive assist control unit is configured to control the vehicle travelling at a predetermined vehicle speed during the waiting time.

2. The vehicle drive assist apparatus according to claim 1, wherein, the takeover request processor further includes:
an intention determination section configured to determine a takeover intention of the driver, and
a manual driving transition section configured to cause the transition to the manual driving to be executed in a case where the driver is determined as having the takeover intention by the intention determination section.

3. The vehicle drive assist apparatus according to claim 2, further comprising:
a direction determination unit comprising an image capturing device configured to determine a direction of a face of the driver, and
a holding detection unit comprising a sensor configured to detect a steering-wheel holding state of the driver, wherein,
the intention determination section determines that the driver has the takeover intention in a case where the driver is determined as facing front by the direction determination unit, and where the steering-wheel holding state of the driver is detected by the holding detection unit.

4. The vehicle drive assist apparatus according to claim 1, wherein the acceleration request is mistakenly made by a driver of the vehicle.

5. The vehicle drive assist apparatus according to claim 1, wherein the output of the drive source of the vehicle is configured to be restricted to a maximum constant value when the intermediate value exceeding a predetermined threshold.

6. The vehicle drive assist apparatus according to claim 1, wherein the intermediate value is set with a control of a target drive torque or a target acceleration.

7. The vehicle drive assist apparatus according to claim 1, wherein the requested amount is obtained by reading an accelerator position output from an accelerator position sensor.

8. The vehicle drive assist apparatus according to claim 1, wherein the takeover request processor further including:
in response to the malfunction not being detected in the traveling environment information acquisition unit and an obstacle being detected on a basis of the traveling environment information acquired by the traveling environment information acquisition unit, the drive assist control unit configured to employ an advanced emergency braking control on vehicle during the waiting time.

9. A vehicle drive assist apparatus to be applied to a vehicle, the vehicle drive assist apparatus comprising:
a traveling environment sensor configured to acquire traveling environment information of a region in front of the vehicle;
a traveling state sensor configured to acquire traveling state information of the vehicle; and
circuitry configured to execute an automatic driving control of the vehicle on a basis of the traveling environment information acquired by the traveling environment sensor and the traveling state information detected by the traveling state sensor,
the circuitry being configured to
detect a malfunction in the traveling environment sensor and the traveling state sensor,
execute a takeover request process for manual driving in a case where the malfunction is detected in one or each of the traveling environment sensor and the traveling state sensor while the vehicle is caused to travel by the automatic driving control, measure a waiting time from a timing when the malfunction is detected to a timing when transition to the manual driving is achieved,
in response to the malfunction being detected in the traveling environment sensor, restrict an output of a drive source of the vehicle to an intermediate value between zero and a requested amount of an acceleration operation in response to receiving an acceleration request during the waiting time, the intermediate value being set based on the requested amount of the acceleration operation to suppress the requested acceleration, and in response to the malfunction not being detected in the traveling environment sensor and no obstacle being detected on a basis of the traveling environment information acquired by the traveling environment sensor, control the vehicle travelling at a predetermined vehicle speed during the waiting time.

10. The vehicle drive assist apparatus according to claim 9, wherein the acceleration request is mistakenly made by a driver of the vehicle.

11. The vehicle drive assist apparatus according to claim 9, wherein the output of the drive source of the vehicle is configured to be restricted to a maximum constant value when the intermediate value exceeding a threshold.

12. The vehicle drive assist apparatus according to claim 9, wherein the intermediate value is set with a control of a target drive torque or a target acceleration.

13. The vehicle drive assist apparatus according to claim 9, wherein the requested amount is obtained by reading an accelerator position output from an accelerator position sensor.

14. The vehicle drive assist apparatus according to claim 9, wherein the circuitry is further configured to:
in response to the malfunction not being detected in the traveling environment sensor and an obstacle being detected on a basis of the traveling environment information acquired by the traveling environment sensor, employ an advanced emergency braking control on vehicle during the waiting time.

* * * * *